US012296647B2

(12) United States Patent
Schroeder et al.

(10) Patent No.: US 12,296,647 B2
(45) Date of Patent: May 13, 2025

(54) REHEATING METHOD FOR OPERATING A REFRIGERATION SYSTEM FOR A MOTOR VEHICLE, REFRIGERATION SYSTEM, AND MOTOR VEHICLE HAVING A REFRIGERATION SYSTEM OF THIS TYPE

(71) Applicant: AUDI AG, Ingolstadt (DE)

(72) Inventors: Dirk Schroeder, Manching (DE); Christian Rebinger, Munich (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 7 days.

(21) Appl. No.: 17/768,724

(22) PCT Filed: Sep. 28, 2020

(86) PCT No.: PCT/EP2020/077049
§ 371 (c)(1),
(2) Date: Apr. 13, 2022

(87) PCT Pub. No.: WO2021/115654
PCT Pub. Date: Jun. 17, 2021

(65) Prior Publication Data
US 2024/0131896 A1    Apr. 25, 2024
US 2024/0227499 A9    Jul. 11, 2024

(30) Foreign Application Priority Data

Dec. 9, 2019   (DE) .......................... 102019133489.6

(51) Int. Cl.
*B60H 1/00* (2006.01)
*F25B 41/31* (2021.01)

(52) U.S. Cl.
CPC ......... *B60H 1/00835* (2013.01); *F25B 41/31* (2021.01); *F25B 2313/02791* (2013.01); *F25B 2400/04* (2013.01); *F25B 2700/21* (2013.01)

(58) Field of Classification Search
CPC ............ B60H 1/00835; B60H 1/00921; B60H 1/3213; B60H 2001/00949;
(Continued)

(56) References Cited

U.S. PATENT DOCUMENTS

| 5,299,431 A | 4/1994 | Iritani et al. |
| 11,364,770 B2 * | 6/2022 | Schroeder ............... F25B 40/00 |
| 2014/0075966 A1 * | 3/2014 | Schmitz ............. B60H 1/00921 165/42 |

(Continued)

FOREIGN PATENT DOCUMENTS

| CN | 107709063 A | 2/2018 |
| CN | 109328147 A | 2/2019 |

(Continued)

OTHER PUBLICATIONS

International Preliminary Report on Patentability, issued on Jun. 23, 2022, in corresponding International Application No. PCT/EP2020/077049; 26 pages.

(Continued)

*Primary Examiner* — Kun Kai Ma
(74) *Attorney, Agent, or Firm* — Maier & Maier, PLLC (57) ABSTRACT

A reheating method for operating a refrigeration system for a motor vehicle is described, the refrigeration system includes a refrigerant compressor, which is connectable or connected to a primary line and a secondary line; an outer heat exchanger, which is arranged in the primary line; an evaporator, which is arranged in the primary line; a heating register, which is arranged in the secondary line; at least one movable temperature flap which is arranged upstream or downstream of the heating register in relation to a supply air flow direction; and at least one shut-off element, which is (Continued)

arranged downstream of the heating register in the secondary line. The reheating method includes adjusting the at least one shut-off element into a position in which refrigerant flows downstream of the heating register into the evaporator, while bypassing the external heat exchanger.

17 Claims, 4 Drawing Sheets

(58) Field of Classification Search
CPC ............. B60H 2001/00957; B60H 2001/3251; B60H 2001/3261; B60H 1/00907; F25B 41/31; F25B 2313/02791; F25B 2400/04; F25B 2700/21; F25B 5/02; F25B 40/00; F25B 41/40; F25B 49/02
See application file for complete search history.

(56) References Cited

U.S. PATENT DOCUMENTS

| | | | | |
|---|---|---|---|---|
| 2014/0075972 A1* | 3/2014 | Heyl | ............... | B60H 1/00507 62/324.1 |
| 2014/0138049 A1* | 5/2014 | Schroeder | .......... | B60H 1/00921 165/63 |
| 2017/0182867 A1* | 6/2017 | Durrani | ............. | B60H 1/00342 |

FOREIGN PATENT DOCUMENTS

| | | | |
|---|---|---|---|
| CN | 112533782 A | | 3/2021 |
| DE | 102006002233 A1 | | 7/2007 |
| DE | 102011118162 A1 | | 5/2013 |
| DE | 102014017446 A1 | | 6/2015 |
| DE | 102014102078 A1 | | 8/2015 |
| DE | 102015002166 A1 | * | 8/2016 |
| DE | 102016008743 B3 | | 10/2017 |
| DE | 102016005782 A1 | | 10/2018 |
| DE | 102018213232 A1 | | 2/2020 |
| EP | 0989003 A2 | | 3/2000 |
| EP | 1456046 A1 | | 9/2004 |
| EP | 2743107 A1 | | 6/2014 |
| JP | S6012327 A | | 1/1985 |
| WO | 2019076615 A1 | | 4/2019 |
| WO | 2019155905 A1 | | 8/2019 |
| WO | 2020030556 A1 | | 2/2020 |

OTHER PUBLICATIONS

German Examination Report, issued on Jun. 18, 2020 in corresponding German Application No. 102019133489; 10 pages.
Office Action issued on Sep. 27, 2024, in corresponding Chinese Application No. 202080083075.4, 26 pages.

* cited by examiner

REHEATING METHOD FOR OPERATING A REFRIGERATION SYSTEM FOR A MOTOR VEHICLE, REFRIGERATION SYSTEM, AND MOTOR VEHICLE HAVING A REFRIGERATION SYSTEM OF THIS TYPE

FIELD

The invention relates to a reheating method (RH I) for operating a refrigeration system with a heat pump function for a motor vehicle, a refrigeration system and a motor vehicle with such a refrigeration system.

BACKGROUND

A refrigeration system with a heat pump function usually includes a refrigerant compressor which can be connected or is connected to a primary line and a secondary line; an outer heat exchanger arranged in the primary line; an evaporator arranged in the primary line; a heating register, which is arranged in the secondary line; at least one movable temperature flap, which is arranged in front of or behind the heating register in relation to a supply air flow direction; and at least one shut-off element, which is arranged downstream of the heating register in the secondary line.

Such a refrigeration system with a heat pump function is described, for example, in DE 10 2018 213 232.1, which had not yet been published at the time the present application was filed.

Further background information on refrigeration systems or heat pumps can be found, for example, in the publications EP 0 989 003 A2, DE 10 2006 002 233 A1 and DE 10 2016 008 743 B3.

In a reheating method, which is also referred to in technical jargon as reheat, reheat operation, reheat method, the air cooled and dehumidified by the evaporator is brought to a desired blow-out temperature by at least partially heating by means of the heating register, when air conditioning a vehicle interior.

The heating register is a heat source in which the heat stored in the refrigerant is given off to another medium, such as air, water, a water-glycol mixture and the like. The heating register can be designed as a heating condenser or heating gas cooler if (ambient) air flows directly around it, as cabin supply air, which absorbs the heat given off. The heating register can be designed as a fluid heat exchanger if a fluid other than (ambient) air, such as water, a water-glycol mixture or the like flows through or around it, wherein the heat stored in the refrigerant is transferred to the fluid. In the configuration as a fluid heat exchanger, a further heat transfer then takes place from the heated fluid to the (ambient) air. In this respect, an indirect heating of (ambient) air in the form of a flow of cabin supply air takes place through a fluid heat exchanger At least one temperature flap can be used in the air flow path between the evaporator and the heating register (i.e. upstream of the heating register), which flap is completely closed (0% open position or closed position) if the air to be fed into the vehicle interior is cooled air and not heated air. When the temperature flap is fully open (100% open), essentially all of the airflow from the evaporator is directed across the heating register and heated. When the temperature flap is partially opened, part of the air is routed over the heating register and the other part of the air is bypassed around the heating register and is not heated, so that a mixture of heated and cooled air is formed downstream of the heating register, which mixture is then supplied to the vehicle interior. Alternatively, the adjustable temperature flap can also be arranged downstream of the heating register.

SUMMARY

The object of the invention is to provide a reheating method that enables optimized operation of the refrigeration system.

This object is achieved by a reheating method, by a refrigeration system and by a motor vehicle.

A reheating method for operating a refrigeration system for a motor vehicle is therefore proposed, the refrigeration system comprising:
- a refrigerant compressor connectable or connected to a primary line and a secondary line;
- an outer heat exchanger arranged in the primary line;
- an evaporator arranged in the primary line;
- a heating register, which is arranged in the secondary line;
- at least one movable temperature flap which is arranged in front of or behind (upstream or downstream of) the heating register with respect to a supply air flow direction;
- at least one shut-off element, which is arranged downstream of the heating register in the secondary line.

The reheating method includes the following steps:
- adjusting the at least one shut-off element into a position in which refrigerant flows downstream of the heating register into the evaporator, while bypassing the external heat exchanger.

Such a method provides a reheating operation or reheat mode by means of a very compact interconnection of the refrigeration system with a minimum of active components.

In the reheating method, the ambient temperature can be detected and the method can be carried out when the ambient temperature is up to 15° C., in particular in a range from about 5° to 15°. This can ensure that the compact wiring of the refrigeration system is carried out when the operating and environmental conditions are favorable for such a reheating operation.

The temperature of the supply air can be measured after it has flowed through the evaporator, wherein a nominal temperature of the supply air after it has flowed through the evaporator can be adjusted depending on a dehumidification requirement or/and on the heating power or/and according to the heating requirement. Corresponding control variables or parameters can be specified by an air-conditioning control unit, which controls or regulates the temperature of the vehicle interior. The dehumidification requirement can be determined, for example, via ambient conditions in interior conditions.

The reheating method can include the following steps:
- adjusting the temperature flap in a desired opening position;
- maintaining the nominal opening position of the temperature flap;
- gradually reducing or gradually increasing the nominal temperature depending on the dehumidification requirement or/and on the heating requirement, which is determined using a refrigeration system parameter, until a predetermined pressure level is established on the high-pressure side at the heating condenser and/or until a maximum or minimum nominal temperature is set. If the nominal temperature is raised, the corresponding control parameters for the dehumidification requirement (dehumidification conditions) are or can additionally be checked.

The adjusting of the nominal temperature of the air after the evaporator is also referred to as varying the setpoint of the air temperature after the evaporator. The desired temperature can be adjusted to a minimum of 2 to 4° C., for example, in order to prevent the evaporator from icing up due to water condensing out of the evaporator supply air flow.

If the desired temperature of the air after passing the evaporator is reduced, more cooled air is provided, correspondingly more or less cooled air can be provided at the heating register, so that a desired blow-out temperature of conditioned inner supply air can be achieved, in particular by appropriate opening or closing of the at least one temperature flap.

After the predetermined pressure level has been reached, the at least one shut-off element can be switched so that the refrigerant flows through the external heat exchanger downstream of the heating register before it flows through the evaporator. In particular, this initiates a transition or switchover from the reheating method described here to another reheating method.

The nominal opening position of the temperature flap can be adjusted to a value between 60% and 90%, in particular to a value between 70% and 85%, based on a maximum opening position of 100%.

In the reheating method, the amount of supply air fed to the evaporator can be adjusted to affect the heating power. The conditioning or quality of the supply air can be adjusted, in particular fresh air or circulating air or a mixture of fresh air and circulating air can be supplied as supply air. In this case, circulating air can be taken from the interior of the vehicle and fresh air is taken from the surroundings of the vehicle.

A refrigeration system for a motor vehicle is also proposed, the refrigeration system having
- a refrigerant compressor connectable or connected to a primary line and a secondary line;
- an outer heat exchanger arranged in the primary line;
- an evaporator arranged in the primary line;
- a heating register, which is arranged in the secondary line;
- at least one movable temperature flap which is arranged in front of or behind (upstream or downstream of) the heating register with respect to a supply air flow direction;
- at least one shut-off element, which is arranged downstream of the heating register in the secondary line.
- wherein the refrigeration system is set up to be operated according to the reheating method described above, and
- wherein, in such a reheating mode, the refrigerant originating from the refrigerant compressor flows through the following components of the refrigeration system in succession, bypassing the external heat exchanger: heating register in the secondary line and evaporator in the primary line.

Depending on the system topology, the external heat exchanger can be provided for mono- or bi-directional flow. As a result, air heat pump operation can be made possible by means of the refrigeration system.

A shut-off valve can be arranged between the heating register and the evaporator and an expansion valve can be arranged between the heating register and the external heat exchanger. Both the shut-off valve and the expansion valve represent a respective shut-off device that is used to carry out the reheating method. With such a configuration, the reheating method can be performed with the shut-off valve open and the expansion valve closed, allowing refrigerant to flow directly from the heating register to the evaporator.

Alternatively, a check valve can be arranged between the heating register and the evaporator. The check valve is also a shut-off device that is used to carry out the reheating method. Such a check valve allows refrigerant to flow through from the heating register in the direction of the evaporator, wherein a flow through or a reverse flow in the opposite direction are prevented. Furthermore, the flow through the external heat exchanger can be in one direction. With such a configuration of the refrigeration system, air heat pump operation is still possible, but reheating operation via a series connection of the heating register with the external heat exchanger is not possible because there is no fluidic connection or line between the heating register and the external heat exchanger. In this respect, such a configuration represents a simplification of a refrigeration system, which, however, can continue to be operated with the reheating method.

As stated above, the flow through the external heat exchanger can be unidirectional or bidirectional, depending on the embodiment of the refrigeration system. In a unidirectional variant, the refrigerant always flows through the external heat exchanger in the same direction or in the same way during refrigeration system operation and in the air heat pump mode. In a bidirectional variant, the refrigerant flows through the external heat exchanger in refrigeration system operation in a different (opposite) direction than in air heat pump mode. With regard to the external heat exchanger, it should also be noted that-similar to the heating register—it can give off heat to the (ambient) air or absorb it both directly (as a gas condenser or gas cooler) and indirectly (as a fluid heat exchanger).

A motor vehicle can be equipped with a refrigeration system as described above. The motor vehicle can in particular be an electric vehicle. In an electric vehicle, the efficient operation of the refrigeration system can lead to electricity savings, so that a greater range of the electric vehicle can be achieved as a result.

BRIEF DESCRIPTION OF THE FIGURES

Other details, aspects and advantages of the present invention result from the following description of embodiments with reference to the drawings. In the Figures.

DETAILED DESCRIPTION

Figure 1:
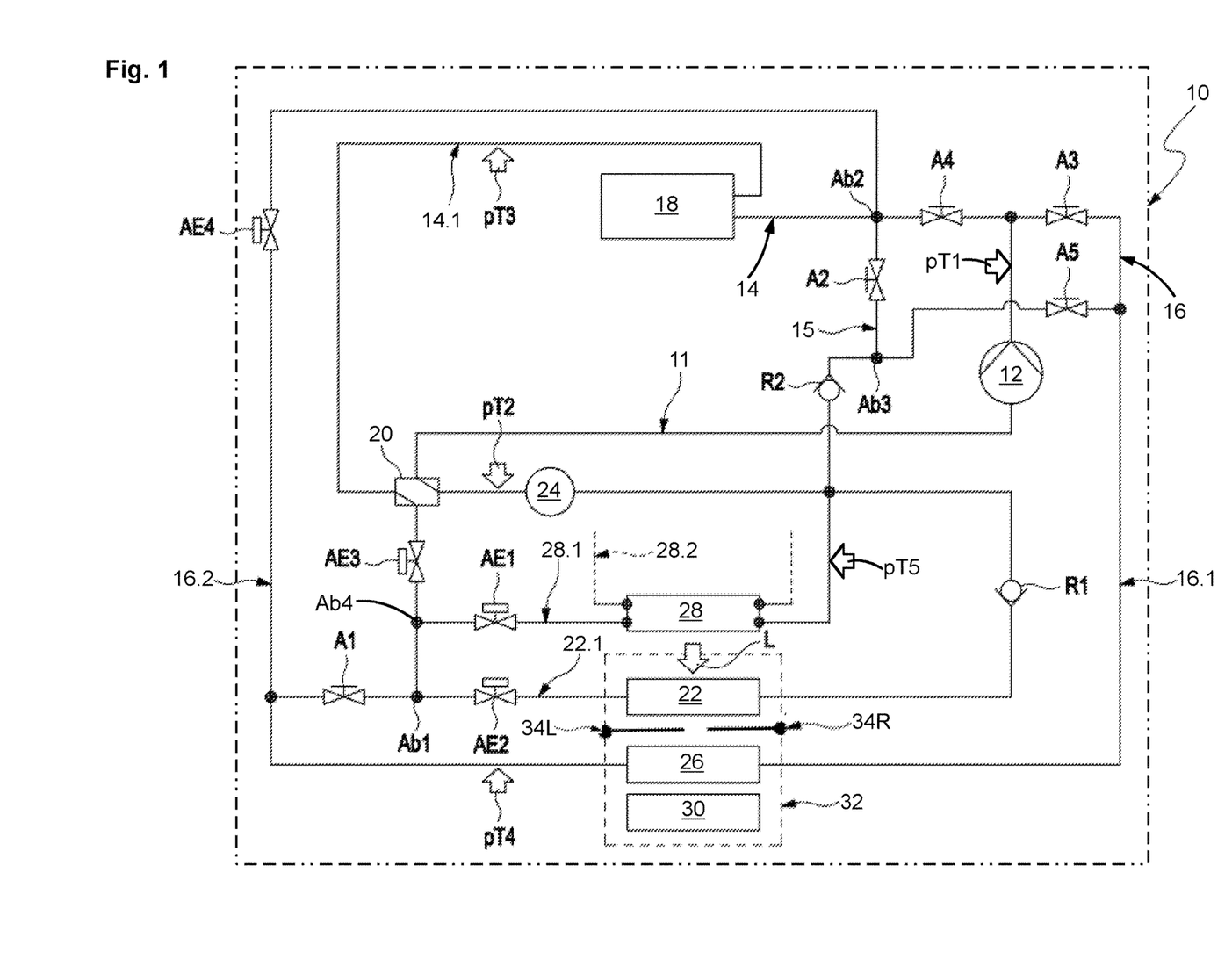
FIG. 1 shows a schematic and simplified circuit diagram of a refrigeration system for a motor vehicle.

FIG. 1 shows an embodiment of a refrigeration system 10 for a motor vehicle in a schematic and simplified manner. The refrigeration system 10 includes a refrigerant circuit 11, which can be operated both in a refrigeration system operation (also called AC operation for short) and in a heat pump mode. In the embodiment shown, the refrigeration system 10 comprises a refrigerant compressor 12, an external heat exchanger 18, an internal heat exchanger 20, an evaporator 22 and an accumulator or refrigerant collector 24. The external heat exchanger 18 can be designed as a condenser or gas cooler. In particular, the flow through the external heat exchanger 18 can be in both directions in the illustrated embodiment.

The evaporator 22 is shown here by way of example as a front evaporator for a vehicle. The evaporator 22 is also representative of other evaporators that are possibly used in a vehicle, such as rear evaporators, which can be arranged parallel to one another in terms of flow. In other words, the refrigeration system 10 includes at least one evaporator 22.

A shut-off valve A4 is arranged downstream of the compressor 12. An expansion valve AE2 is provided upstream of the evaporator 22.

In the context of this description, the section going from the compressor 12 to the outer heat exchanger 18, to the inner heat exchanger 20 and to the evaporator 22 is referred to as the primary line 14 in the entire refrigerant circuit 11 of the refrigeration system 10.

The refrigeration system 10 further includes a heating register 26 (also referred to as a heating condenser or heating gas cooler). A shut-off valve A3 is arranged upstream of the heating register 26. A shut-off valve A1 is arranged downstream of the heating register 26. Furthermore, an expansion valve AE4 is arranged downstream of the heating register 26.

Within the scope of this description, the section from the compressor 12 to the heating register 26, to the expansion valve AE4 and to a branch Ab2 is referred to as the secondary line 16 in the entire refrigerant circuit of the refrigeration system 10. The secondary line 16 includes a heating branch 16.1, which extends from the shut-off valve A3 via the heating register 26 to the shut-off valve A1. The secondary line 16 also includes a reheating branch or reheat branch 16.2, which can be fluidly connected to heating register 26 in an upstream position and to external heat exchanger 5 in a downstream position. The secondary line 16 or the reheat branch 16.2 opens into the primary line 14 at a branching point Ab2.

The refrigeration system 10 includes a further evaporator or chiller 28. The flow of the chiller 28 is provided parallel to the evaporator 22. The chiller 28 can be used, for example, to cool an electrical component of the vehicle, but also to implement a water heat pump function using the waste heat from at least one electrical component. An expansion valve AE1 is connected upstream of the chiller 28.

The refrigeration system 10 can also have an electrical heating element 30 which is designed, for example, as a high-voltage PTC heating element. The electric heating element 30 is used as an additional heater for a supply air flow L guided into the vehicle interior. The electric heating element 30 can be accommodated in an air conditioning unit 32 together with the heating register 26 and the evaporator 22. In this case, the electrical heating element 30 can be arranged downstream of the heating register 26.

FIG. 1 also shows check valves R1 and R2. Furthermore, some sensors pT1 to pT5 for detecting the pressure and/or temperature of the refrigerant are also shown. It is pointed out that the number of sensors and their arrangement is only shown here as an example. A refrigeration system 10 can also have fewer or more sensors. In the example shown, the sensors shown are combined pressure/temperature-sensors pT1 to pT5. However, it is just as conceivable that separate sensors are used for measuring pressure or temperature and, if necessary, are also arranged separately from one another along the refrigerant lines The refrigeration system 10 can be operated in different modes, which are briefly described below.

In AC operation of the refrigerant circuit 11, the refrigerant compressed to high pressure flows from the refrigerant compressor 12 when the shut-off valve A4 is open into the outer heat exchanger 18. From there it flows to the high-pressure section of the inner heat exchanger 20 and to the fully open expansion valve AE3. The refrigerant can flow to the expansion valve AE2 and into the interior evaporator 22 via a branch point Ab1 (evaporator section 22.1). In parallel or alternatively, the refrigerant can flow into the chiller 28 (chiller section 28.1) via a branch point Ab4 and the expansion valve AE1. From the evaporator 22 or/and from the chiller 28, the refrigerant flows on the low-pressure side into the collector 24 and through the low-pressure section of the internal heat exchanger 20 back to the compressor 12.

In AC operation, the heating branch 16.1 or the secondary line 16 is shut off by means of the shut-off valve A3, so that hot refrigerant cannot flow through the heating register 26. To recover refrigerant from the inactive heating branch 16.1, the shut-off element A5 designed as a shut-off valve can be opened, so that the refrigerant can flow in the direction of the collector 24 via the shut-off element A5 and the check valve R2, with the shut-off element A2 being closed at the same time.

During heating operation of the refrigerant circuit 11, the shut-off valve A4 is closed and the shut-off valve A3 is opened, so that hot refrigerant can flow into the heating branch 16.1.

To carry out the heating function by means of the chiller 28 to implement water heat pump operation, the refrigerant compressed by the refrigerant compressor 12 flows via the open shut-off valve A3 into the heating register 26. At the heating register 26, heat is given off to an supply air flow L guided into the vehicle interior. The refrigerant then flows via the open shut-off valve A1 and the branch point Ab1. It is expanded by means of the expansion valve AE1 in the chiller 28 to absorb waste heat from the electrical and/or electronic components which are arranged in a refrigerant circuit 28.2. With this heating function, the expansion valves AE3 and AE4 are closed, the shut-off valve A5 is closed and the shut-off valve A2 is open. In this case, refrigerant which is offloaded via the shut-off valve A2 in water heat pump operation, can be sucked out of a bidirectional branch 14.1 or the primary line 14 and fed to the collector 24 via the check valve R2.

To carry out the heating function by means of the external heat exchanger 18 as a heat pump evaporator, the refrigerant compressed by the refrigerant compressor 12 flows via the open shut-off valve A3 to transfer heat to a supply air flow L into the heating register. The refrigerant is then expanded via the open shut-off valve A1 by means of the expansion valve AE3 into the external heat exchanger 18 for absorbing heat from the ambient air. The refrigerant then flows via a heat pump return branch 15 to the collector 24 and back to the refrigerant compressor 12. The expansion valves AE1, AE2 and AE4 remain closed, as does the shut-off valve A5.

An indirect delta connection can be implemented in that, when the shut-off valve A1 is open, the refrigerant compressed by the refrigerant compressor 12 is expanded by means of the expansion valve AE1 into the chiller 28, wherein, at the same time, on the refrigerant side, i.e. in the refrigerant circuit 28.2, no mass flow is generated, i.e. the fluid used as refrigerant, such as water or water-glycol mixture, remains on the refrigerant side of the chiller 28 or the chiller 28 is not actively flowed through by refrigerant. The expansion valves AE2, AE3 and AE4 remain closed in this circuit variant.

In an reheating or reheat operation, the supply air flow L fed into the vehicle interior is first cooled by means of the evaporator 22 and thus dehumidified. With the heat transferred to the refrigerant by evaporation and dehumidification and the heat supplied to the refrigerant via the compressor 12, the supply air flow L can be completely or at least partially reheated by means of the heating register 26.

For this purpose, the refrigeration system 10, in particular the air conditioning unit 32, has adjustable, in particular controllable and pivotable, temperature flaps 34 between the evaporator 22 and the heating register 26. In the example shown, left and right temperature flaps 34L and 34R (shown schematically in FIG. 1) are arranged. The temperature flaps 34L, 34R can be adjusted or pivoted between an open position, which is called the 100%-position, and a closed position called the 0%-position. Alternatively, it is also possible to connect the temperature flaps 34R, 34L downstream of the heating register 26.

In the 100%-position the entire supply air flow L flowing through the evaporator 22 is guided via the heating register 26 and heated before it can flow into the passenger compartment of the vehicle. In the 0%-position the entire supply air flow L flowing through the evaporator 22 flows in the bypass around the heating register 26 without heating and thus without absorbing heat into the passenger compartment.

In an x-position of the temperature flaps 34L and 34R with 0%<x<100% these temperature flaps are only partially open, so that in each case only a partial air flow of the supply air flow L flowing through the evaporator 22 is routed via the heating register 26. This heated partial air flow can then be mixed with the remaining, cooled and dehumidified partial air flow. The thus heated supply air flow L is supplied to the passenger compartment of the vehicle. As an example, a 50%-position indicates, that the temperature flaps 34R and 34L are only half open, i.e. by 50%.

The reheating or reheat operation of the refrigerant circuit 11 or the refrigeration system is carried out in different ways depending on the thermal balance.

An operating method 500 that can be applied for reheating or reheat-operation is explained below by way of example using the flowchart in FIG. 2 and with reference to the refrigeration system 10 shown in FIG. 1 and its components. Such an operating method is usually implemented as a control program in a control device for the refrigeration system or for the air conditioning in a vehicle.

A reheating operation is considered, in which the refrigerant flows from the compressor 12 via the open shut-off valve A3 to the heating register 26 (heating condenser or heating gas cooler). The expansion valve AE4 is closed and the shut-off valve A1 is open, so that the refrigerant can flow into the evaporator 22 via the expansion valve AE2. The expansion valves AE3 and AE1 are also closed. The reheating operation is thus achieved by connecting the refrigeration system 10 with as few active components as possible.

Figure 2:
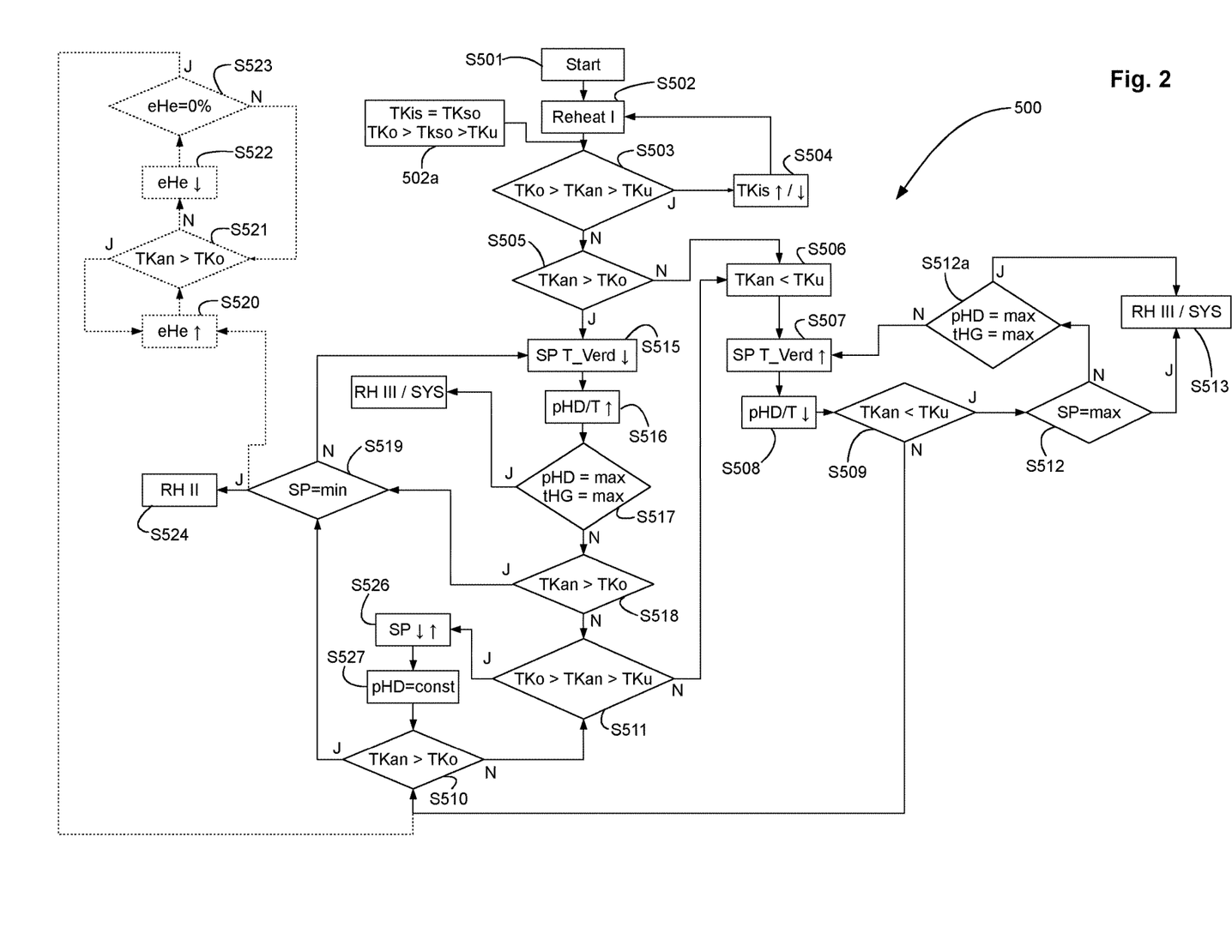
FIG. 2 shows a flow chart of an exemplary implementation of the reheating method, in particular by means of the refrigeration system described in FIG. 1.

According to the reheating method 500 shown in FIG. 2, in operation, after the start (S501) of the refrigeration system 10, a transition to reheating operation, which is referred to here as Reheat I (S502), takes place at a point in time not specified here. A possible condition that must be met in order to start the reheating operation (S502) can be the measured ambient temperature, for example. The reheating method can be activated especially when the ambient temperature is up to 15° C., in particular from about 5° C. to 15° C.

In the reheating method 500, the temperature flaps 34L, 34R, which are two in this application, are adjusted to a nominal opening position TKso. TKso may be a specific opening value or, as shown in FIG. 2 at 502a, may be a range from an upper opening limit TKo to a lower opening limit TKu. During operation of the refrigeration system 10, at least one refrigeration system parameter is used to determine whether the heating requirement is constant, increasing or decreasing. A variable or refrigeration system parameter used here as an example is the temperature flap opening TKan requested by a control unit. If a larger temperature flap opening TKan is required, the heating requirement is increasing. If a smaller temperature flap opening TKan is required, the heating requirement is decreasing. For the following description it is pointed out that a temperature flap opening TKan requested by the system in the reheating method considered here does not necessarily result in a corresponding adjustment of the actual opening position or effective opening position TKis of the temperature flaps 34L, 34R.

As already mentioned, it is assumed that the temperature flaps are in an actual open position TKis, which is in the range from TKo to TKu. According to step S503, it is checked whether a requested temperature flap opening TKan is smaller than the upper opening limit value TKo and larger than the lower opening limit value TKu. If this is the case, according to step S504 the temperature flaps 34L, 34R can be adjusted in their actual open position TKis, which is indicated by the two arrows in step S504. The refrigeration cycle and/or the periphery influencing the climatic conditions for performing the change remain unchanged. If the condition of step S503 is not met, it is checked in S505 whether the requested temperature flap opening is greater than the upper opening limit value TKo. Outside these limits the refrigeration circuit and/or the periphery influencing the climatic conditions, perform a change and thus a reaction to the changed requirements and boundary conditions.

If this is not the case, the requested opening position TKan is smaller than the lower opening limit value TKu (S506). This means that the heating requirement is falling and that the temperature flaps 34L, 34R should actually be closed further. According to the reheating method 500 described here, however, the temperature flaps are not (yet) closed any further. Rather, in step S507 the nominal temperature of supply air L exiting at the evaporator 22 is increased. In other words, the nominal temperature for the temperature of the supply air L after it has flowed through the evaporator 22 is set as a function of the heating output or the heating requirement. Increasing the nominal temperature at the evaporator 22 influences the pressure and temperature of the refrigerant, particularly in the heating register 26 in the refrigeration circuit 11, wherein, when the nominal pressure at the evaporator 22 rises the pressure pHD is falling (S508).

In S509 it is checked whether the requested temperature flap opening TKan is smaller than the lower opening limit value TKu. If this is the case, it is checked in S512 whether the nominal temperature for the supply air exiting at the evaporator 22 is already adjusted to a maximum value, resulting from the required dehumidification specified by the control unit and/or a maximum permissible upper limit. When the maximum adjustable temperature has been reached, the reheating method Reheat I is terminated and a switch is made to another reheating method, which is referred to here as RH III (S513).

In addition, in S512a, in a further system protection, it is evaluated whether a maximum pressure pHD or a maximum hot gas temperature tHG is reached. In particular, in the case of a strongly dynamic closing of the temperature flaps 34L, 34R, there is a branching to S513 and thus a change to a further reheat circuit, the so-called Reheat III.

It would also be conceivable to first carry out a further increase in the set point of the air temperature after the evaporator in accordance with method step S507. However, due to the system dynamics already indicated, a mode change to Reheat Ill may appear to be the preferred measure. As a result, this is preferred in the flowchart.

When switching to a reheating method RH III, the expansion valve AE4 can be opened (gradually) and the shut-off valve A1 is closed, so that the refrigerant flows from the heating register 26 to the evaporator 22 via the external heat exchanger 18. As an alternative to switching to a different reheating method, adjustments SYS for the operation of the refrigeration system 10 can be made on the system side, such as closing the temperature flaps 34L, 34R, wherein the system behavior of the refrigeration circuit always has to be monitored.

If the maximum adjustable nominal temperature has not yet been reached, the nominal temperature is increased further according to S507 and steps S508 and S509 are run through again. As long as the heating requirement is decreasing, steps S507, S508, S509, S512 are run through several times.

If the condition in S509 is not met, in S510 a check is made as to whether the requested temperature flap opening TKan is greater than the upper opening limit value TKo. If this is not the case, it is checked in S511 whether the requested temperature flap opening is in the nominal range, i.e. between TKo and TKu. If this is the case, it is assumed that the adjusted nominal temperature is appropriate and can be substantially maintained (S526). As a result, according to S527, the pressure pHD is kept essentially constant.

If the heating requirement increases, the method is carried out as follows, starting from steps S503 and S505 already mentioned above. If it is determined in S505 that the requested temperature flap opening TKan is greater than the upper opening limit value TKo, this means that the heating requirement is increasing and that the temperature flaps 34L, 34R should actually be opened further. According to the reheating method described here, however, the temperature flaps are not (yet) opened any further. Rather, in step S515 the nominal temperature for the supply air exiting the evaporator is lowered. The nominal temperature can be lowered incrementally. As a result, according to S516, the high pressure pHD in the heating register 26 increases. The temperature T of the refrigerant in the heating register 26 also increases accordingly.

In S517 it is checked whether the high pressure present in the refrigeration system 10 has reached a maximum value. If this is not the case, S518 checks whether the requested temperature flap opening TKan is greater than the upper opening limit value TKo. If this is the case, it is checked in S519 whether the nominal temperature has already been adjusted to a minimum possible value. If the minimum adjustable temperature has not yet been reached, the system branches off again to S515 and the nominal temperature is lowered further.

As long as the heating requirement is increasing, steps S515, S516, S517, S518, S519 are run through multiple times. The minimum adjustable temperature can be between 2° and 4°; in particular, the minimum adjustable temperature is selected such that the evaporator 22 is prevented from icing up as a result of condensate falling out.

If it is determined in S517 that a maximum pressure pHD or a maximum hot gas temperature tHG has been reached, a branching to S525 occurs. S525 represents a change or switching over to another reheating method, which is designated here as RH III. When switching to a reheating method RH III, the expansion valve AE4 can be opened (gradually) and the shut-off valve A1 is closed, so that the refrigerant flows from the heating register 26 to the evaporator 22 via the external heat exchanger 18. As an alternative to switching to a different reheating method, system-side adjustments SYS can be made for the operation of the refrigeration system 10, such as the compressor 12 being regulated down or/and an adjustment of other system parameters.

If it is determined in S519 that the nominal temperature has already been adjusted to a minimum value, a branching to S524 occurs, which illustrates the switch-over to a different reheating method RH II.

As an alternative to switching over to the reheating method RH II (S524), switching on the electrical heating element 30 (S520) can be considered for the reheating method Reheat I. If, according to S521, the requested temperature flap opening TKan is still above the upper opening limit value TKo, the heating power or heat output of the electric heating element 30 is further increased. If the condition in S520 is no longer met due to a decreasing heating requirement, the heating power or heat output of the electrical heating element 30 is reduced again in accordance with S522. If the electrical heating element 30 is no longer active, which is checked in S523, a branching occurs to steps S510 and S511, so that when the heating requirement falls or has fallen, the pressure can be adjusted by raising the nominal temperature (S507).

In addition to the measures described above for carrying out the reheating method, the quantity of supply air L supplied to the evaporator 22 can be adjusted in order to influence the heating output. The conditioning or quality of the supply air can be adjusted, in particular fresh air or circulating air or a mixture of fresh air and circulating air can be supplied as supply air. In this case, circulating air can be taken from the interior of the vehicle and fresh air is taken from the surroundings of the vehicle.

Figure 3:
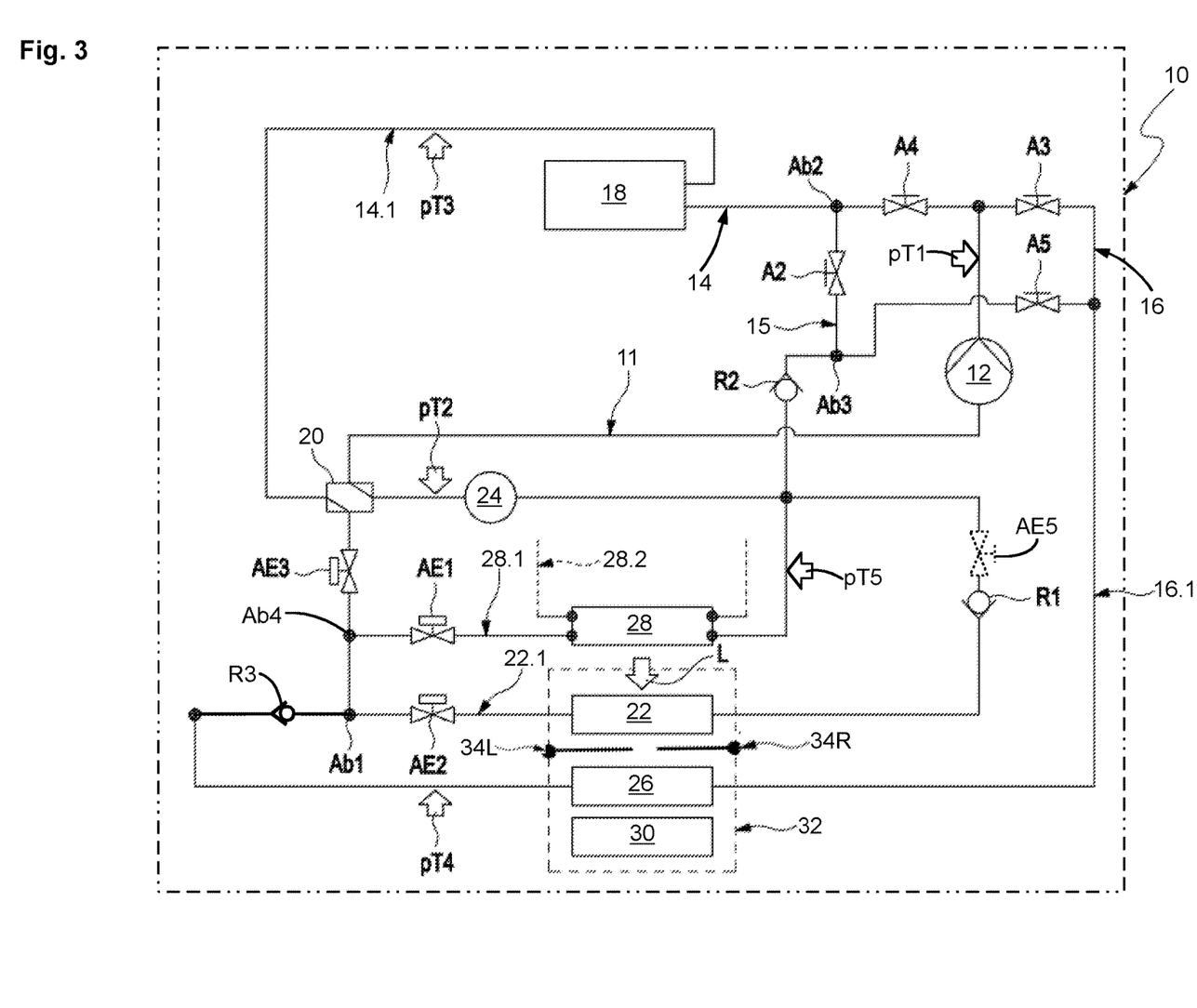
FIG. 3 shows a schematic and simplified circuit diagram of an embodiment of a refrigeration system for a motor vehicle for carrying out the reheating method.

FIG. 3 shows an embodiment of a refrigeration system 110 with which the reheating method RH I described above with reference to FIG. 2 can also be carried out. The refrigeration system 110 according to this embodiment is structurally simplified compared to the refrigeration system 10 shown in FIG. 1. As can be seen from FIG. 3, downstream of the heating register 26 only one connection to the evaporator 22 or the chiller 28 is provided. The refrigeration system 110 no longer has a reheating branch or Reheat-branch (RH III) 16.2 (FIG. 1). Accordingly, the external heat exchanger 18 can no longer be connected in series with the heating register 26 either.

In order to be able to carry out the reheating method described above also with the simplified refrigeration system 110, a check valve R3 is arranged between the heating register 26 and the expansion valve AE2 or the expansion valve AE1. The check valve R3 allows refrigerant to flow through from the heating register 26 to the evaporator 22 in accordance with the reheating method described above, but prevents refrigerant flow in the opposite direction, i.e. when the refrigeration system is operating in AC mode.

FIG. 3 also shows an expansion valve AE5 downstream of the evaporator 22 in a dashed representation. Such an expansion valve AE5 can be arranged in all of the embodiments of the refrigeration system 10, 110 (FIGS. 1, 3, 4) shown, in order to replace the check valve R1. By arranging the expansion valve AE5 downstream of the evaporator 22, an intermediate pressure level that is above the icing limit can be achieved at the evaporator 22. Any other heat source that is integrated can be operated at a low-pressure level.

Figure 4:
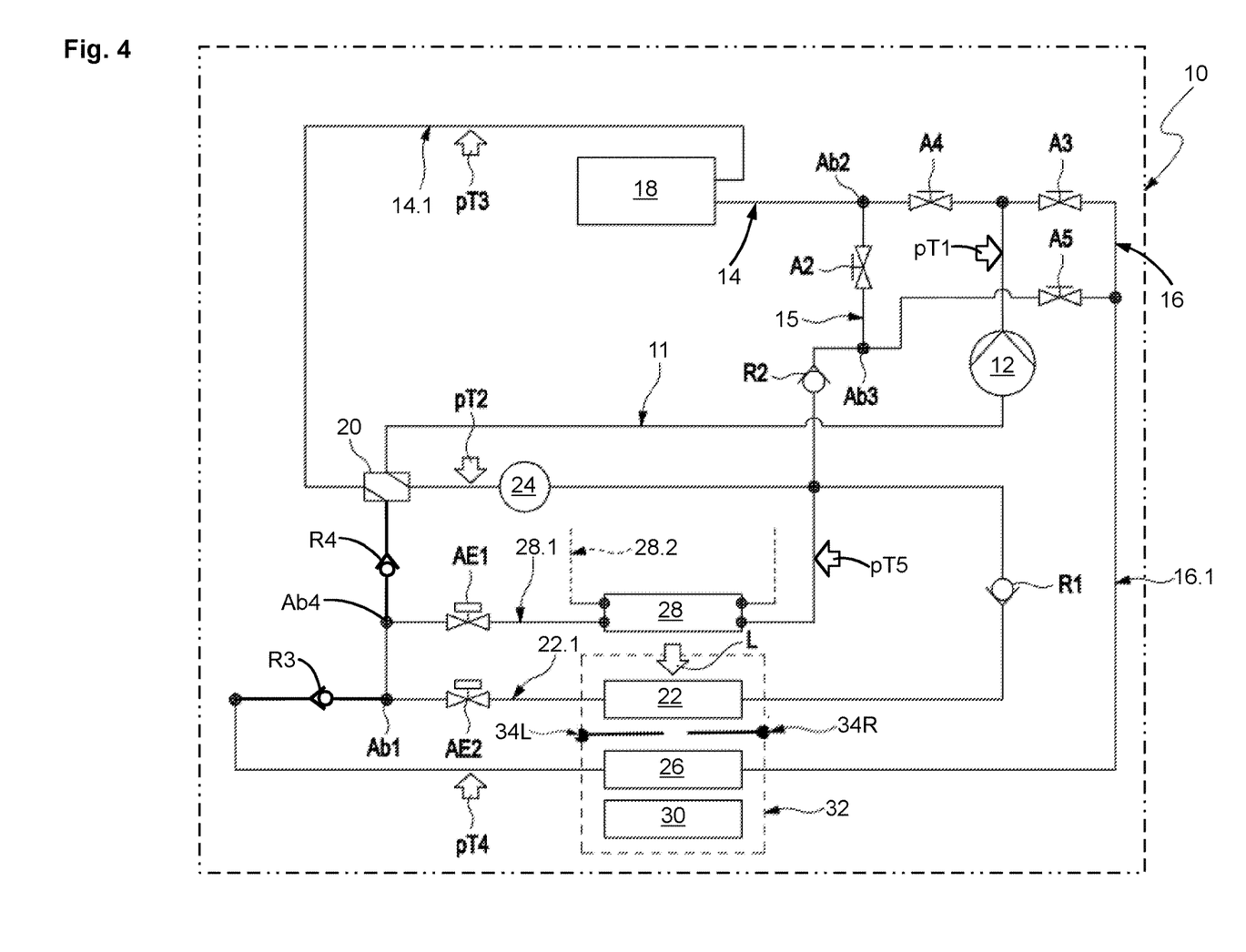
FIG. 4 shows a schematic and simplified circuit diagram of an embodiment of a refrigeration system for a motor vehicle for carrying out the reheating method.

FIG. 4 shows the simplified refrigeration system with another possible adaptation. Instead of the expansion valve AE3 still present in FIG. 3, a check valve R4 can be provided, which is arranged between the internal heat exchanger 20 and the evaporator 22 or chiller 28. Refrigerant flows through the check valve R4 during AC operation of refrigeration system 110. In a heating mode, the check valve R4 prevents a flow of refrigerant from the heating register 26 to the high-pressure side of the internal heat exchanger 20. The reheating method described above (FIG. 2) can also be carried out with this further simplified configuration of the refrigeration system 110.

With regard to the adapted structure of the refrigeration system 110 according to FIGS. 3 and 4, it is pointed out that with such a configuration it is not possible to switch over to a different reheating method RH III, as illustrated in steps S513 and S525, but that instead system-side adjustments SYS have to be made.

The reheating method described above with reference to FIG. 2 can be carried out with the following values, for example. TKso can be set from 60% to 90%, in particular to a value between 70% and 85%, with reference to the maximum opening position of 100%. For example, TKu can be 78% and TKo can be 82%, so that TKso covers a range from 78% to 82%. The selection of suitable opening limit values TKu and TKo can be selected in particular as a function of the properties of the refrigeration system used, wherein the range from TKu to TKo should be selected rather narrowly, in particular so that the ratio TKu/TKo is greater than or equal to 0.8. For the above example with TKu=78% and TKo=82% the ratio is calculated as 0.95.

The reheating method described in this application can be achieved by connecting a minimum number of components of the refrigeration system 10, 110. This also offers the possibility of considering a simplified structure of the refrigeration system 110.

The invention claimed is:

1. A reheating method for operating a refrigeration system for a motor vehicle, the refrigeration system comprising:
 a refrigerant compressor, which is connectable or connected to a primary line and a secondary line;
 an outer heat exchanger, which is arranged in the primary line;
 an evaporator, which is arranged in the primary line;
 a heating register, which is arranged in the secondary line;
 at least one movable temperature flap which is arranged upstream or downstream of the heating register in relation to a supply air flow direction;
 at least one shut-off element, which is arranged downstream of the heating register in the secondary line;
 wherein the reheating method comprises the following steps:
 adjusting the at least one shut-off element into a position in which refrigerant flows downstream of the heating register into the evaporator, while bypassing the external heat exchanger,
 wherein the temperature of the supply air is measured after the supply air has flowed through the evaporator and wherein a nominal temperature for the temperature of the supply air after flowing through the evaporator is adjusted as a function of a dehumidification requirement or/and of the heating power or/and of the heating requirement.

2. The reheating method of claim 1, wherein the ambient temperature is detected and the method is carried out when the ambient temperature is up to 15° C.

3. The reheating method of claim 1, further comprising the steps of:
 adjusting the at least one movable temperature flap in a nominal opening position;
 maintaining the nominal opening position of the at least one movable temperature flap;
 gradually decreasing or gradually increasing the nominal temperature depending on the heating requirement, which is determined using a refrigeration system parameter, until a predetermined pressure level is established on the high-pressure side of the heating register or/and until a maximum or minimum nominal temperature is adjusted.

4. The reheating method of claim 3, wherein, after the predetermined pressure level has been reached, the at least one shut-off element is opened, so that the refrigerant flows downstream of the heating register through the external heat exchanger before it flows through the evaporator.

5. The reheating method of claim 3, wherein the nominal opening position of the at least one movable temperature flap is adjusted to a value between 60% and 90%, based on a maximum opening position of 100%.

6. The reheating method of claim 1, wherein the amount of supply air supplied to the evaporator is adjusted in order to influence the heating power.

7. The reheating method of claim 6, in which the condition or quality of the supply air is adjusted, in particular fresh air or circulating air or a mixture of fresh air and circulating air is supplied.

8. The reheating method of claim 3, wherein the nominal opening position of the at least one movable temperature flap is adjusted to a value between 70% and 85%, based on a maximum opening position of 100%.

9. The reheating method of claim 2, wherein the amount of supply air supplied to the evaporator is adjusted in order to influence the heating power.

10. The reheating method of claim 3, wherein the amount of supply air supplied to the evaporator is adjusted in order to influence the heating power.

11. The reheating method of claim 4, wherein the amount of supply air supplied to the evaporator is adjusted in order to influence the heating power.

12. A refrigeration system for a motor vehicle, with
 a refrigerant compressor, which is connectable or connected to a primary line and a secondary line;
 an outer heat exchanger, which is arranged in the primary line;
 an evaporator, which is arranged in the primary line;
 a heating register, which is arranged in the secondary line;
 at least one movable temperature flap which is arranged upstream or downstream of the heating register in relation to a supply air flow direction;
 at least one shut-off element, which is arranged downstream of the heating register in the secondary line;
 wherein the refrigeration system is set up to be operated in an reheating mode
 wherein, in the reheating mode, the refrigerant, starting from the refrigerant compressor, flows through the following components of the refrigeration system in succession, while bypassing the external heat exchanger: heating register in the secondary line, evaporator in the primary line, and
 wherein the temperature of the supply air is measured after the supply air has flowed through the evaporator and wherein a nominal temperature for the temperature of the supply air after flowing through the evaporator is adjusted as a function of a dehumidification requirement or/and of the heating power or/and of the heating requirement.

13. The refrigeration system of claim 12, wherein the external heat exchanger configured to permit passage of flow in both directions.

14. The refrigeration system of claim 12, wherein a shut-off valve is arranged between the heating register and the evaporator and wherein an expansion valve is arranged between the heating register and the external heat exchanger.

15. The refrigeration system of claim 12, wherein a check valve is arranged between the heating register and the evaporator.

16. The refrigeration system of claim 15, wherein the external heat exchanger is configured to limit flow to unidirectional flow and is separate from the heating register.

17. A motor vehicle with a refrigeration system of claim 12.

\* \* \* \* \*